United States Patent Office 3,065,266
Patented Nov. 20, 1962

3,065,266
BIS(PERFLUOROALKYL) PHOSPHINIC NITRIDES
Giorgio Tesi and Catherine M. Douglas, Riverside, Calif., assignors to the United States of America as represented by the Secretary of the Navy
No Drawing. Filed July 6, 1961, Ser. No. 122,353
3 Claims. (Cl. 260—551)
(Granted under Title 35, U.S. Code (1952), sec. 266)

The invention herein described may be manufactured and used by or for the Government of the United States of America for governmental purposes without the payment of any royalties thereon or therefor.

The present invention relates to perfluoroalkyl phosphorous compounds and more particularly to the compounds trimeric and tetrameric bis(perfluoromethyl)phosphinic nitrides, and trimeric bis (heptafluoropropyl)phosphinic nitride.

This type of compounds is known to undergo thermal polymerization with the formation of elastomeric materials. The presence of perfluoroalkyl groups is known to confer to the resulting elastomeric compounds properties of thermal stability and resistance to oxidation. In general, the compounds of the present invention are useful intermediates for the preparation of elastomeric materials having unusual or exceptional properties.

The compounds of the present invention can be prepared by use of the reactions described in copending patent application Serial No. 122,360, filed July 6, 1961, for Synthesis of Polymeric Bis(Perfluoroalkyl)Phosphinic Nitrides. These compounds, having cyclic structures, are new and have not been synthesized prior to this invention.

It is an object of the present invention to provide a new and useful compound, trimeric bis(perfluoromethyl)phosphinic nitride.

It is another object of the invention to provide the new and useful compound, tetrameric bis(perfluoromethyl)phosphinic nitride.

A further object of the invention is to provide a new and useful composition of matter, trimeric bis(heptafluoropropyl)phosphinic nitride.

It is also a further object of the invention to provide new and useful perfluoroalkyl phosphorous compounds that are useful intermediates for the preparation of elastomeric materials.

Other objects and many of the attendant advantages of this invention will become readily appreciated as the same becomes better understood by reference to the following detailed description:

Compounds of the present invention, trimeric and tetrameric bis(trifluoromethyl)phosphinic nitrides $$[(CF_3)_2PN]_{3,4}$$

were prepared by chlorination at low temperature ($-40°$ C.), of bis(trifluoromethyl)phosphinous amide $$(CF_3)_2PNH_2$$

in chloroform or carbon tetrachloride solution, followed by dehydrohalogenation by use of a tertiary amine (i.e. trimethylamine). The scheme of the process is represented by the following equations:

$$(CF_3)_2PNH_2 + Cl_2 \xrightarrow[\text{in solvent}]{-40° C} (CF_3)_2P(Cl_2)NH_2$$

$$(CF_3)_2P(Cl_2)NH_2 \xrightarrow{\text{tertiary amine}} [(CF_3)_2PN]_{3,4}$$

Experimental details of this reaction are described in the aforementioned copending patent application for Synthesis of Polymeric Bis(Perfluoroalkyl)Phosphinic Nitrides, as follows: Ten grams of bis(trifluoromethyl)phosphinous amide $(CF_3)_2PNH_2$, was transferred in an air-free system to a three-necked flask fitted with stirrer, Dewar condenser and inlet for gas. About 50 ml. of $CHCl_3$ was then introduced as solvent and the flask cooled at $-30°$ C. with a Dry-Ice/acetone bath. The stoichiometric amount of chlorine was introduced through the gas inlet keeping the solution in the flask under vigorous stirring. A smooth reaction took place and the whole amount of $Cl_2$ was used. After the addition was completed, the mixture was slowly treated with two equivalents of trimethylamine. A white precipitate was immediately formed. The mixture was then allowed to warm up to room temperature. The volatile materials were then removed under reduced pressure and the white solid material left was thoroughly extracted with $CHCl_3$ in a Soxhlet extractor to remove the trimethylamine hydrochloride present. The white powder left was dried under vacuum. A high yield of about 60% polymeric bis(perfluoromethyl)phosphinic nitrides was thus obtained (18% $[(CF_3)_2PN]_3$, 15% $[(CF_3)_2PN]_4$ and 27% higher polymers).

All the volatile materials were transferred from the reaction mixture under vacuum and then fractionated through U-traps maintained at $-10°$ C., $-44°$ C., and $-78°$ C. At $-44°$ C. a yield of 12% of crystal like material (melting point 64° C.) was recovered. Elemental analysis, molecular weight determination and infrared spectroscopy proved this compound to be trimeric bis-(trifluoromethyl)phosphinic nitride, $[(CF_3)_2PN]_3$

I.

$$\begin{array}{c} CF_3 \quad N \quad CF_3 \\ CF_3-P \quad \quad P-CF_3 \\ \parallel \quad \quad \parallel \\ N \quad \quad N \\ \diagdown P \diagup \\ CF_3 \quad CF_3 \end{array}$$

At $-10°$ C. a yield of 25% of crystalline material (melting point 109° C.) was obtained. Elemental analysis, molecular weight determination and infrared spectroscopy proved this compound to be tetrameric bis(trifluoromethyl)phosphinic nitride, $[(CF_3)_2PN]_4$.

II.

$$\begin{array}{c} CF_3 \quad CF_3 \\ | \quad \quad | \\ CF_3-P-N=P-CF_3 \\ \parallel \quad \quad | \\ N \quad \quad N \\ | \quad \quad \parallel \\ CF_3-P=N-P-CF_3 \\ | \quad \quad | \\ CF_3 \quad CF_3 \end{array}$$

Molecular weights:
I. Found from vapor pressure measurements: 536. Calculated for $[(CF_3)_2PN]_3$: 549.
II. Found: 716. Calculated for $[(CF_3)_2PN]_4$: 732.
Elemental analysis of the two compounds:
I. Calculated: C, 13.1; N, 7.65; F, 62.2; P, 16.95. Found: C, 13.4; N, 7.8; F, 62.2; P, 16.6.
II. Calculated: C, 13.1; N, 7.65; F, 62.2; P, 16.95. Found: C, 12.9; N, 7.6; F, 62.2; P, 16.6

Infrared analysis of the two compounds showed the presence of vibrational frequencies characteristic of cyclic P—N structures.

The compound trimeric bis(heptafluoropropyl)phosphinic nitride, $[(C_3F_7)_2PN]_3$ was synthesized by chlorination of bis(heptafluoropropyl)phosphinous amide $$(C_3F_7)_2PNH_2$$

in chloroform (or carbon tetrachloride) solution at low temperature ($-30°$ C.). Subsequent dehydrohalogenation was accomplished by use of a tertiary amine (trimethylamine). Upon removal of the solvent, a white crystalline material was recovered by sublimation (70% yield). Recrystallization from ligroin (65–74° fraction) was used to purify this compound. Melting point 85°

C. Elemental analysis, molecular weight determination and infrared spectral analysis proved the composition:

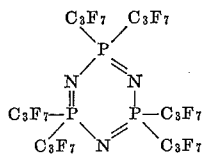

Elemental analysis:
Calculated for $[(C_3F_7)_2PN]_3$: C, 18.85; F, 69.42; P, 8.08; N, 3.65. Found: C, 19.06; F, 69.25; P, 8.07; N, 3.79.

Molecular weight (ebullioscopic in carbon tetrachloride):
Calculated: 1149. Found: 1139.

Examination of the infrared spectra substantiates the structure of the compound shown above. Strong absorption peaks are present which are characteristic of

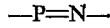

and C—F linkages.

Obviously many modifications and variations of the present invention are possible in the light of the above teachings. It is therefore to be understood that within the scope of the appended claims the invention may be practiced otherwise than as specifically described.

What is claimed is:

1. The compound of the formula:

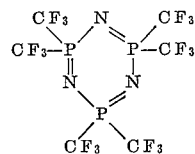

2. The compound of the formula:

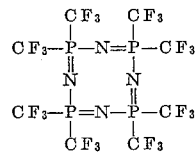

3. The compound of the formula:

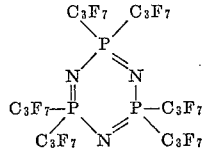

References Cited in the file of this patent
UNITED STATES PATENTS 2,858,306      Ratz ------------------ Oct. 28, 1958

OTHER REFERENCES

Audrieth et al.: Chemical Review, vol. 32, pp. 125–130 (1943).

Harris: J. Chem. Soc. (London), pp. 512–519 (1958).